United States Patent [19]

Okada

[11] Patent Number: 5,140,675
[45] Date of Patent: Aug. 18, 1992

[54] PRINTER CONTROLLER APPARATUS INTERFACING WITH EXTERNAL DATA SOURCES

[75] Inventor: Kunio Okada, Kawasaki, Japan

[73] Assignee: Canon Kabushiki Kaisha, Tokyo, Japan

[21] Appl. No.: 804,518

[22] Filed: Dec. 10, 1991

Related U.S. Application Data

[63] Continuation of Ser. No. 582,786, Sep. 17, 1990, abandoned, which is a continuation of Ser. No. 262,350, Oct. 25, 1988, abandoned.

[30] Foreign Application Priority Data

Oct. 30, 1987 [JP] Japan .................................. 62-273562

[51] Int. Cl.⁵ .................... G06F 3/12; G06K 15/00
[52] U.S. Cl. ........................... 395/114; 395/107; 395/112; 346/154
[58] Field of Search ............. 395/114, 107, 112, 106, 395/113; 346/154, 160; 358/296, 300

[56] References Cited

U.S. PATENT DOCUMENTS

| | | | |
|---|---|---|---|
| 4,031,519 | 6/1977 | Findley | 364/900 |
| 4,464,733 | 8/1984 | Misker et al. | 364/900 |
| 4,673,990 | 6/1987 | Okada | 358/296 |
| 4,682,190 | 7/1987 | Ikeda | 346/154 |
| 4,717,967 | 1/1988 | Yoshida | 358/296 |
| 4,814,892 | 3/1989 | Igarashi | 358/296 |

Primary Examiner—Gary V. Harkcom
Assistant Examiner—Raymond J. Bayerl
Attorney, Agent, or Firm—Fitzpatrick, Cella, Harper & Scinto

[57] ABSTRACT

A printing unit allows connection of two or more signal sources, thereby improving the efficiency of use of the printing unit. For this purpose the printing unit or printer has a first image signal source for supplying a first image signal. The first image signal source is connectable with a second image signal source for generating a different image signal, and has a control unit for controlling the function of the second signal source.

9 Claims, 5 Drawing Sheets

PRINTER CONTROLLER APPARATUS INTERFACING WITH EXTERNAL DATA SOURCES

This application is a continuation of application Ser. No. 07/582,786, filed Sept. 17, 1990, now abandoned, which is a continuation of application Ser. No. 07/262,350, filed on Oct. 25, 1988, now abandoned.

BACKGROUND OF THE INVENTION

1. Field of the Invention

The present invention relates to a data processing apparatus for processing code data or image data.

2. Related Background Art

Various printing apparatus, such as laser beam printers, have rapidly become popular in recent years.

Such printing apparatus can be divided into a controller unit and a printer unit in view of their functions. The controller unit receives various data such as character code data from a host computer, for example, edits said data as image information (dot information) in units of a character or of a page, and sends said information as an image signal together with various print control signals to the printer unit. Said printer unit is equipped with a sheet feeding mechanism and an image forming mechanism having a semiconductor laser unit, a photosensitive drum etc., and effects a printing operation on a recording sheet, according to the control signals and image signals from the controller unit. In the following description, the interface signals between the controller unit and the printer unit, including the image signals and the control signals such as commands or status signals, will be collectively called a video interface signal.

However, in such printing apparatus, well improved efficiency of use of the printer unit is not always obtained because only one controller unit can be connected to the printer unit. Also such printer is uneconomical because each host apparatus has to be equipped with a printer unit.

The above-explained printing apparatus are disclosed for example in U.S. Pat. No. 4,823,192, 4,786,923, 4,866,555 and 4,835,618 and in U.S. Pat. application Ser. No. 07/554,187, filed Jul. 20, 1990 (effective U.S. Filing data Apr. 23, 1987), but further improvements have been desired.

SUMMARY OF THE INVENTION

An object of the present invention is to eliminate the above-explained drawbacks.

Another object of the present invention is to provide an improvement on a data processing apparatus used for a printing apparatus and the like.

Still another object of the present invention is to provide a data processing apparatus of high economic effect.

Still another object of the present invention is to enable connection of plural data sources to a printer unit.

Still another object of the present invention is to provide a data processing apparatus capable of improving the efficiency of use of the printer unit.

Still another object of the present invention is to provide a data processing apparatus capable of resolving various inconveniences when plural data sources are connected to a common printer unit.

Still another object of the present invention is to provide a data processing apparatus capable, in case of a request for the switching of connection of image signal and the like to a printer unit, of discriminating whether the switching of the signals to the printer unit is possible by inspecting the operation state of the printer unit, and, if, for example, sheet transportation or printing operation is in progress, prohibiting the switching of an interface signal until the process in progress is terminated.

According to the present invention, a data processing apparatus is provided, comprising data processing means capable of connecting to first and second data sources simultaneously, the two data sources being different from each other. The data processing means further comprises, according to one embodiment, means for processing data from the first source, to produce a first image signal, means for supplying to a printing unit either that first image signal or a second image signal from the second source, and means for inhibiting simultaneous supply of both signals to the printing unit. According to another aspect, the data processing means includes means for processing data from at least one of the data sources and means for selecting data entry from the first or the second source. According to a third embodiment, the data processing means includes means for processing sent from the first source to produce a first image signal, and means for selecting between supply of the first image signal, and supply of the second image signal from the second source, to a printing unit.

Still other objects and features of the present invention, and the advantages thereof, will become fully apparent from the following description to be taken in conjunction with the attached drawings, and from the appended claims.

DESCRIPTION OF THE PREFERRED EMBODIMENT

Now the present invention will be clarified in detail by description of the preferred embodiment thereof shown in the attached drawings.

In a printing apparatus such as a laser beam printer, in addition to video interface signal lines connecting the printer unit with the controller unit, there may be provided video interface signal lines to the printer unit, arranged to be directly connectable with the exterior for connection with another external apparatus (hereinafter referred to as "external controller"), thereby printing image data from a host computer through the controller unit, or printing an image with a common printer unit by directly controlling the printer unit from the external controller.

Figure 4:
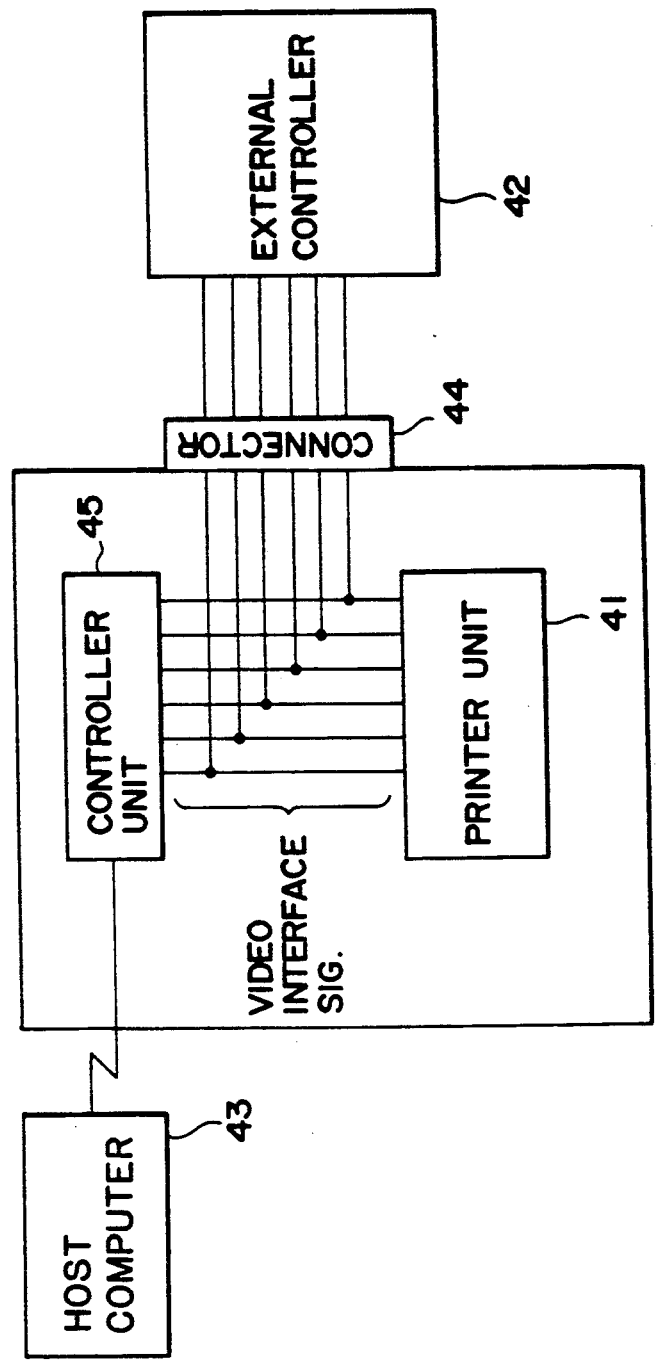
FIG. 4 is a block diagram showing a structure of a connection switch unit for selecting a controller unit or an external controller.

In such case, as shown in FIG. 4, the video interface signal lines to the printer unit 41 are branched and one part of the lines is connected, to a connector 44 of the external controller 42, and the other part is connected to the controller unit 45 for entering data from the host computer 43. Also there may be provided, at the branching portion, mechanical or electrical switch means for making connection only to the external controller 42 or the controller unit 45 at a given timing, thereby preventing the collision of video signals at the printer unit 41.

However, in the structure shown in FIG. 4, the video interface signals to the printer unit 41 can be switched at an arbitrary timing. Consequently, the switching of the video signals may take place in the course of a printing operation, thereby causing an interruption in the image signals or providing a half-blank print from the printer unit 41.

Also if the signal switching takes place in the course of transportation of a recording sheet in the printer unit 41, the controller unit 45 (or the external controller 42) that has newly acquired the controlling right resets the printer unit 41, so that the sheet transporting mechanism is stopped, eventually causing sheet jamming.

Consequently, the printing apparatus embodying the present invention is constructed in the following manner.

The printing apparatus is provided with input/output means constituting an interface for printing data corresponding to plural data sources; image forming means for image formation based on the printing data; switch means for switching the input/output means to guide the printing data from each data source to the image forming means; detecting means for detecting the printing state in the image forming means; and means for determining the timing of switching by the switch means in accordance with the printing state.

In the above-explained structure, the input/output means effects interface function of the printing data corresponding to plural data sources, and the image forming means executes the image formation based on the printing data. The switch means executes the switching of the input/output means, thereby sending the printing data from various data sources to the image forming means. The timing of switching by the switch means is determined in accordance with the detected state of printing in the image forming means.

[Structure of laser beam printer (FIG. 1)]

Figure 1:
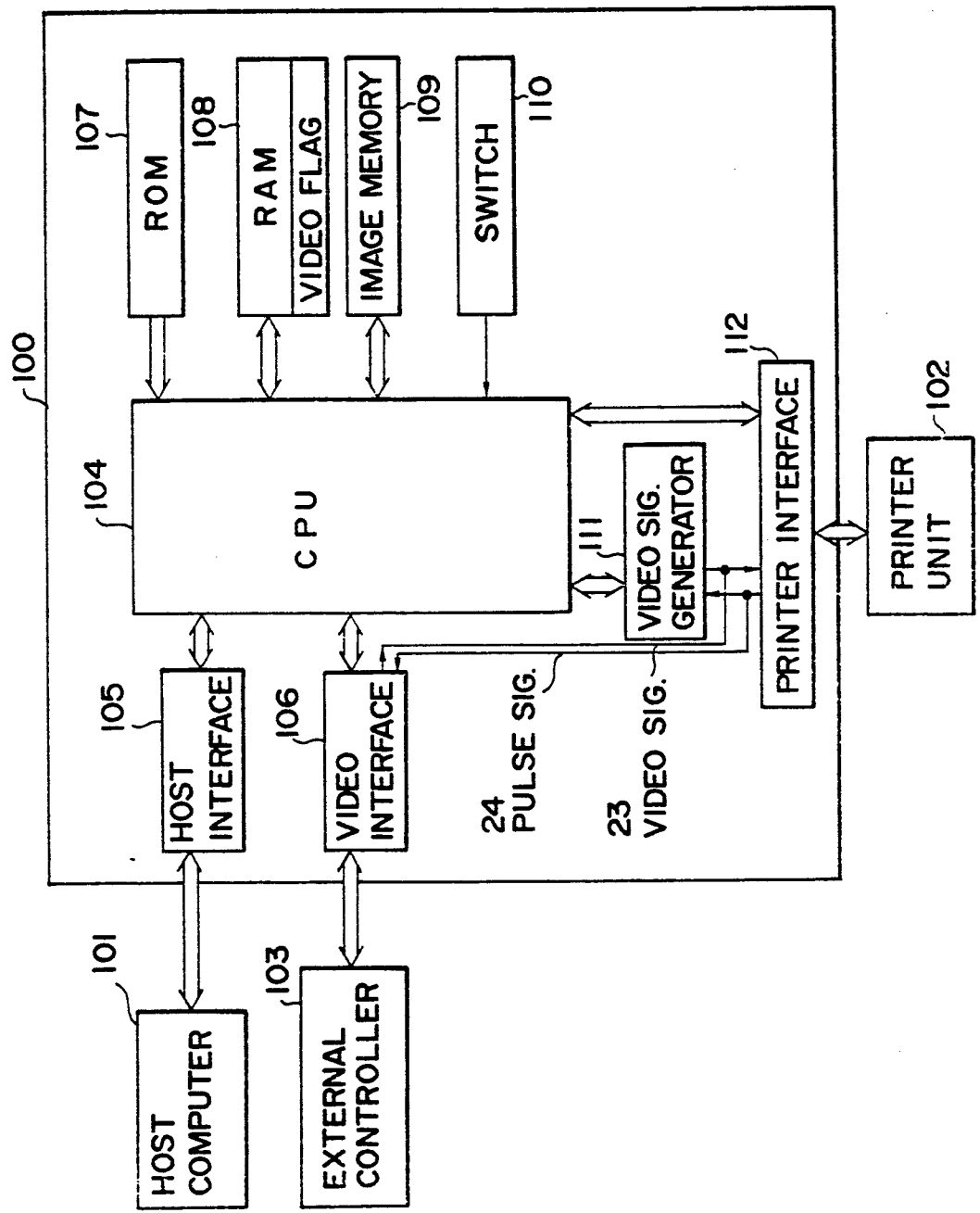
FIG. 1 is a block diagram showing a schematic structure of a laser beam printer of an embodiment of the present invention and connection with external equipment.

FIG. 1 is a block diagram schematically showing the structure of the controller unit 100, namely a data processing apparatus, of a laser beam printer of the present embodiment.

In FIG. 1, 101 indicates a host computer for supplying the laser beam printer with printing data such as character codes. The printing data and various control data from the host computer 101 are supplied to a CPU 104 through a host interface 105, which is composed of an ordinary 8-bit parallel interface or a serial interface such as RS232C, for transmitting and receiving 8-bit code input signals and various control signals for handshake and error display functions.

An external controller 103 for supplying the laser beam printer with video signals, independently from the host computer 101. The video signals from the external controller 103 are supplied, either through a video interface 106 to the CPU 104, or directly to a printer unit 102 for image formation through a printer interface 112.

The external controller 103 can also be of the same structure as the data processing apparatus 100, for generating dot patterns based on code signals sent from another host computer.

Figure 3:
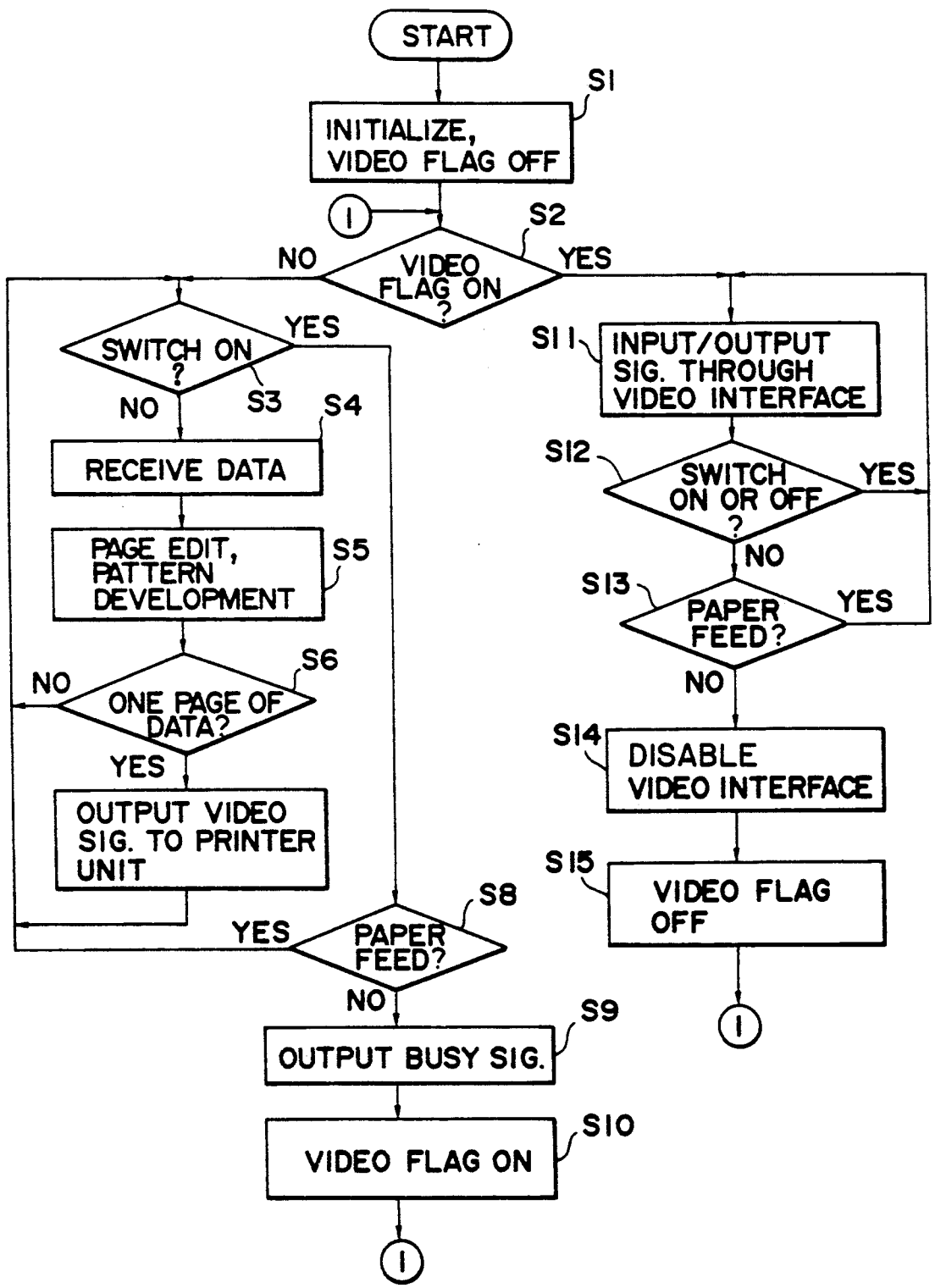
FIG. 3 is a flow chart showing a printing sequence in a control unit of the embodiment of FIG. 1.

The CPU 104, for controlling the entire data processing apparatus 100, produces various control signals in accordance with a control program stored in a ROM 107 shown in a flow chart of FIG. 3, and sends printing data to the printer unit 102 for effecting image formation. The ROM 107 also stores various data and pattern information such as various character patterns, thus functioning as a character generator for providing character patterns in response to input character codes. A RAM 108 is used as a work area of the CPU 104 for temporarily storing various data, and is provided with flag areas, for example, a video flag to be explained later.

An image memory 109 stores dot information developed as a pattern by the pattern data of the ROM 107 in response to the code information from the host computer 101, or the entered dot information, in the form of a bit map. A switch 110 switches the image data source supplying the image data to the printer unit 102. When the switch 110 is off, there is selected a control mode (hereinafter referred to as an internal mode) in which the data processing apparatus 100 controls the printer unit 102 on the basis of the data from the host computer 101, but, when the switch 110 is on, there is selected a mode (hereinafter referred to as an external mode) in which the printer unit 102 is controlled by the external controller 103. The state of the switch 110 is inspected by the CPU 104 in accordance with the control program stored in the ROM 107, and is utilized in the switching control of data source as will be explained later.

A video signal generator 111, for converting the image data (dot information) of the image memory 109 into video signals, supplies the printer unit 102 with video signals of a line at a time, in synchronism with a synchronization signal from the printer unit 102. The printer interface 112 is used for exchange of the interface signals between the printer unit 102 and the data processing apparatus 100.

The external controller 103 is capable of directly sending the data to the printer unit 102, through the video interface 106 and the printer interface 112. A video signal 23 to be supplied to the printer unit 102 and a beam detection signal BD 24 from the priter unit 102 are directly exchanged between the video interface 106 and the printer interface 112. Other interface signals between the external controller 103 and the printer unit 102 are exchanged between the video interface 106 and the CPU 104.

If the CPU 104 is unable to use the printer unit 102 for the printing of data from the host computer 101, due to a printing operation executed by the external controller 103, the CPU 104 sends a busy signal, indicating the disabled state for data reception, to the host computer 101 through the host interface 105.

[Description of an Interface with the printer unit (FIG. 2)]

Figure 2:
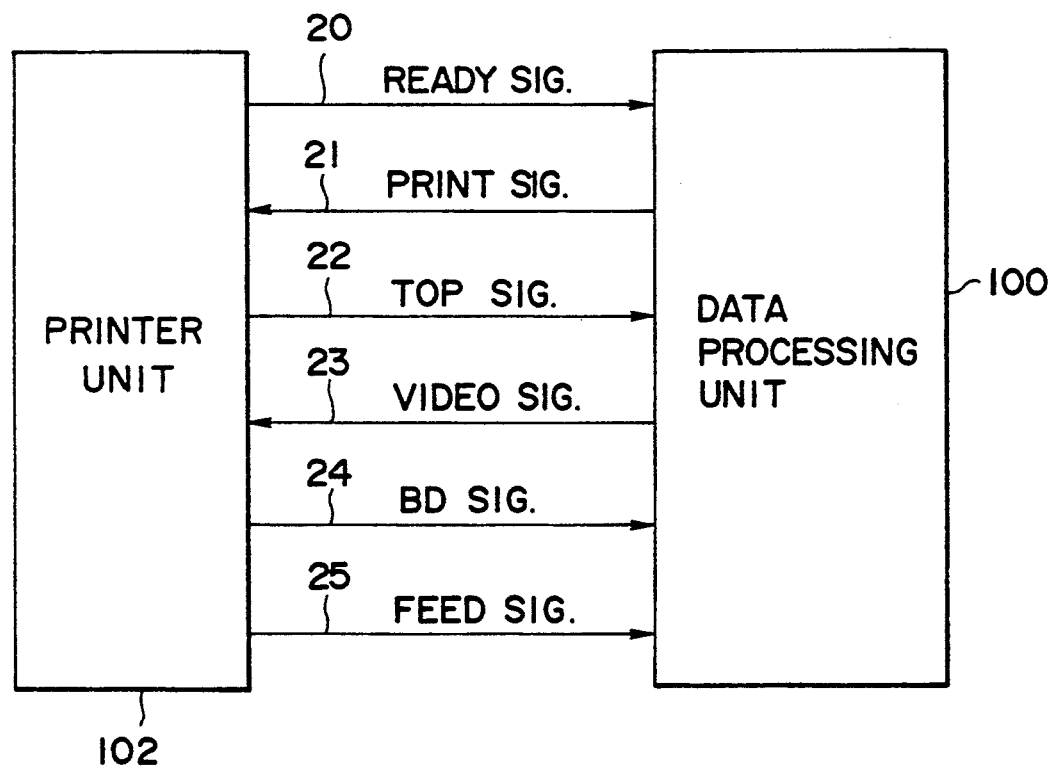
FIG. 2 is a view showing interface signals between a printer unit and a data processing apparatus or an external controller.

FIG. 2 illustrates the interface signals between the printer unit 102 and the data processing unit 100.

In FIG. 2 there are shown a READY signal 20 generated from the printer unit 102 and a status signal indicating a status as to whether the printer unit 102 is ready; a PRINT signal 21 to be supplied by the data processing unit 100 for initiating sheet feeding in the printer unit 102 when it is ready (READY signal 20 being on); and a TOP signal 22 to be produced as a pulse signal by the printer unit 102 when the recording sheet passes through a predetermined position. In response to the signal 22 utilized as a vertical synchronization signal, the data processing unit 100 turns off the PRINT signal 21, thereby preparing for a next request for sheet feeding. Also in response to the TOP signal, the data processing unit 100 starts to send the image data of a page to the printer unit 102.

There are also shown a VIDEO signal 23 supplied from the data processing unit 100 or the video interface 106 (external controller 103) to the printer unit 102 in the amount of a scanning operation with the laser beam, in response to image clock signals; a beam detection (BD) pulse signal 24 produced from the printer unit 102 at each scanning operation of the laser beam, indicating the scanning position of the beam as disclosed in the U.S. Pat. No. 4,059,833 and utilized as a horizontal synchronization signal; and a sheet feed signal 25 produced from the printer unit 102 and maintained in the on state from the start of sheet feeding to the completion of sheet discharge from the printer unit 102. Similar video interface signals are exchanged between the printer unit 102 and the external controller 103.

[Function (FIG. 3)]

FIG. 3 is a flow chart showing the sequence of input and switching of the printing data supplied from the host computer 101 through the data processing unit 100 or from the external controller 103, and the output of video signals to the printer unit 102.

At first, step S1 initializes the data processing unit 100, thereby turning off a video flag in the RAM 108. Thus, the READY, TOP and FEED signals supplied from the video interface 106 to the external controller 103 are all turned off, thus advising the external controller 103 of the unavailable state of the printer unit 102.

Then step S2 checks the state of the video flag in the RAM 108, and, if it is off, indicating the internal mode, step S3 discriminates whether the switch 110 is on. If it is off, the sequence proceeds to step S4 for receiving the data from the host computer 101 through the host interface 105. Next, step S5 executes page editing, by analyzing the received data, reads the corresponding pattern data from the ROM 107, determines the positions of characters on a page, and executes pattern development in the image memory 109.

Then, step S6 discriminates whether the image data of a page have been stored in the image memory 109, and, if stored, step S7 activates the printer unit 102 and causes the video signal generator 111 to send the video signals to the printer unit 102 for image formation.

On the other hand, if step S3 identifies that the switch 110 is on, indicating the external mode, the sequence proceeds to step S8 for discriminating whether a sheet is in transportation in the printer unit 102. If in the course of transportation, the sequence returns to step S3 to continue the interface operation with the host computer 101. The discrimination is made by the state of the FEED signal 25 from the printer unit 102.

When the FEED signal 25 is turned off, indicating the complete discharge of the sheet from the printer unit 102, the sequence proceeds to step S9 for sending the BUSY signal from the host interface 105 to the hostcomputer 101, thereby advising of the disabled state for data reception of the data processing unit 100 and prohibiting the data input from the host computer 101. Then step S10 turns on the video flag in the RAM 108, and sequence returns to the step S2. The BUSY signal is cancelled before the data reception in step S4.

If the video flag is on in step S2, the sequence proceeds to step S11 for receiving the input signals from the external controller 103 through the video interface 106, sending the same to the printer unit 102 through the printer interface 112, also receives the input signals from the printer unit 102 through the printer interface 112 and sending the same to the external controller 103 through the video interface 106.

Then step S12 checks the state of the switch 110, and, if it is on, the sequence returns to step S11, but, if it is off, the sequence proceeds to step S13 for discriminating whether the sheet transportation is in progress in the printer unit 102. If the sheet transportation is in progress, the sequence returns to step S11, but, if it is not in progress (if the FEED signal is off), the completion of transportation is identified, and step S14 turns off the READY signal etc., of the video interface 106. The input of the video signals from the external controller 103 is prohibited in this manner. Then step S15 turns off the video flag in the RAM 108, and the sequence returns to step S2.

Therefore, either in the internal mode or in the external mode, the switching of the interface is conducted only after the completion of printing of a page, so that incomplete printing can be avoided.

Though the present embodiment has been explained by reference to a laser beam printer for collective printing of data in units of a page, it is not limited to such case but is applicable to various printing apparatus such as an ink jet printer or a LED printer.

Also in the present embodiment the enabled/disabled state of switching of the video interface signals is discriminated by the FEED signal, but such discrimination can naturally be made with a suitable signal or a suitable timing of signal adequate for the printer unit to be employed.

Particularly in printer units with complex structure, the state thereof cannot be represented by one or two signals line, but can only be understood through the exchange, for example of command codes and status codes (request/response codes) in serial signals, between the control unit and the printer unit. Also in such case, it is possible, in response to a request for switching the video interface signals, to determine the timing of the switching by sending a status request command in serial data from the control unit (data processing unit) to the printer unit, and discriminating the state of the printer unit from a response status signal received from the printer unit.

Also in the present embodiment, when the video interface signals from the external controller 103 are enabled, a part of the video interface signal between the external controller 103 and the printer unit 102 is supplied to the external controller 103 and the printer unit 102 through the CPU 104, which inspects the movement of the signals simultaneously with the transfer thereof. However, there may also be adopted an alternative structure, in which all the video interface signal lines are formed directly between the external controller 103 and the printer unit 102 in the same manner as between the data processing unit 100 and the printer unit 102 and are provided with a switch circuit controllable from the data processing unit 100 and means allowing the data processing unit 100 to inspect the signal status between the external controller 103 and the printer unit 102, whereby the enabled/disabled statue of switching of the video interface signals is checked for determining the switching.

Also in such case, the VIDEO signal from the external controller 103 is preferably made switchable by a switching circuit, because, in case of disabling the video signal from the external controller 103, it is made possible to physically interrupt the video signal and to prevent eventual perturbation of the reproduced image caused by the stray signal transmitted from the external controller 103 to the printer unit 102.

In the present embodiment, the switching of the video interface signals of the external controller 103 and the host computer 101 is conducted by the switch 110, but it is also possible to add signal lines from the external controller 103 and the host computer 101 to the control unit 104, thereby enabling one to enter a switching request from the outside.

As explained in the foregoing, the present embodiment inspects the operation state of the printer unit when a request is entered for switching the video interface signals, thereby avoiding the destruction of the printed image or the sheet jamming, resulting from the switching of the interface signals in the course of a printing operation or a sheet transporting operation.

Figure 5:
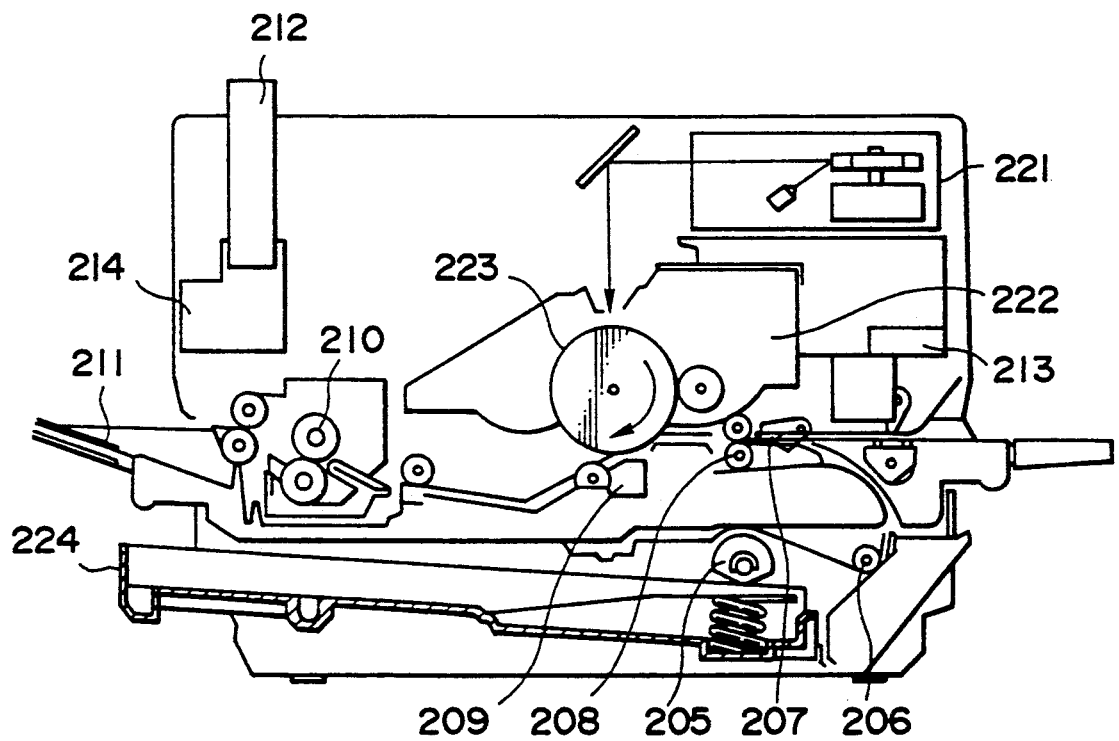
FIG. 5 is a schematic cross-sectional view of a laser beam printer in which the present invention is applicable.

FIG. 5 is a schematic cross-sectional view of a laser beam printer in which the present invention is applicable.

In FIG. 5, there are an exposure device 221 provided with a scanner and a laser unit; a photosensitive drum 222; a developing unit 223 for rendering visible a latent image formed on the photosensitive drum 223; a sheet cassette 224; a sheet feeding roller 205 for feeding sheets, one by one, from the cassette 224 to a transport roller 206; a registration shutter 207 for temporarily stopping the sheet transported by the transport roller 206, thereby synchronizing the sheet feeding with the laser beam projection and the rotation of the photosensitive drum 223; feeding rollers 208 for feeding the sheet to a transfer section 209; a fixing unit 210 for fixing the toner image transferred onto the sheet; a stacker 211 for received the discharged sheets; and a detachable auxiliary memory 212 incorporating a built-in ROM and utilized as a character generator.

In such laser beam printer, the timing of sheet transportation, image development, etc., is controlled by a sequence controller 213.

A data processing unit 214 converts code signals, supplied from an unrepresented host computer (not shown), into image signals, and the laser beam is turned on and off in response to the binary signals produced from the data processing unit.

The data processing unit 214 corresponds to the data processing unit 100 shown in FIG. 1, and the components except the data processing unit 214 and the auxiliary memory 212 in FIG. 5 correspond to the printer unit 102 shown in FIG. 1.

The character generator 212 is used when pattern signals other than the character font (pattern signal) stored in the data processing unit 214 are required, and the pattern signals in the character generator 212 are read in response to code signals entered by the data processing unit 214.

The present invention is not limited to the foregoing embodiment but is subject to various modifications within the scope and spirit of the appended claims.

What is claimed is:

1. A printing apparatus comprising:
   first interface means for inputting code data;
   second interface means for inputting a first image signal from an external image signal generating source;
   a data processor for conducting processes on the code data to generate a second image signal;
   switch means for designating one of the code data and the first image signal to be input, selectively;
   output means for outputting either the first image signal or the second image signal in accordance with a designation by said switch means;
   a printing unit for performing a print operation in accordance with whichever of the first and the second image signal is output from said output means; and
   a controller for sending a control signal through said second interface means so as to control a sending operation of the image signal generating source, for sending the first image signal, on the basis of a state of said printing unit, wherein said controller inhibits the image signal generating source from sending the first image signal while said printing unit performs the printing operation in accordance with the second image signal, even if said switch means is switched to designate the first image signal while the second image signal is being recorded, and wherein said printing apparatus receives the code data sent from the code data source in asynchronism with a sync signal output from said printing unit, and receives the first image signal sent from the image signal generating source in synchronism with the sync signal.

2. A printing apparatus according to claim 1, further comprising means for inhibiting said data processor from outputting the second image signal to said printing unit during inputting of the first image data.

3. A printing apparatus according to claim 1, wherein said printing unit performs a printing operation by an electrophotographic method, using an optical beam modulated on the basis of the first or the second image signal, and comprises a scanner for scanning the optical beam and a detector for detecting the optical beam a predetermined positions to generate the sync signal.

4. A printing apparatus according to claim 1, further comprising a memory for storing data for indicating which, as between the code data and the image data, should be inputted, wherein the data stored in said memory is not rewritten until the end of an image forming operation by said printer unit even if said switch means is switched during the image forming operation.

5. A controller for controlling a printer unit comprising:
   first interface means for inputting code data in asynchronism with a sync signal output from the printer unit;
   second interface means for inputting a first image signal sent from an external image signal generating source in synchronism with the sync signal;
   a data processor conducting processes on the code data to generate a second image signal;
   switch means for designating one of the code data and the first image signal;
   output means for outputting the first or the second image signal to the printer unit in accordance with a designation by said switch means; and
   means for sending a control signal to the external image signal generating source so as to control a sending of the first image signal, wherein, when said switch means is switched to designate the first image signal during a printing of information contained in the second image signal, said control signal sending means inhibits the image signal generating source from sending the first image signal at least until all the completion of the printing of the information contained in the second image signal.

6. A controller according to claim 5, further comprising means for inhibiting said data processor from outputting the second image signal to the printing unit during inputting of the first image data.

7. A controller according to claim 5, wherein the printing unit performs a printing operation by an electrophotographic method, using an optical beam modulated on the basis of the first or the second image signal, and comprises a scanner for scanning the optical beam and a detector for detecting the optical beam at predetermined positions to generate the sync signal.

8. A controller according to claim 5, wherein said data processor comprises a memory for storing one page of the second image signal.

9. A printing apparatus according to claim 5, further comprising a memory for storing data for indicating which of the code data and the image data is designated by said switch means, wherein the data stored in said memory is renewed when the printing operation by the printer unit is completed, and said control signal sending means refers to the data stored in said memory for sending the control signal.

* * * * *

UNITED STATES PATENT AND TRADEMARK OFFICE
CERTIFICATE OF CORRECTION

PATENT NO. : 5,140,675
DATED : August 18, 1992
INVENTOR(S) : KUNIO OKADA

It is certified that error appears in the above-identified patent and that said Letters Patent is hereby corrected as shown below:

TITLE PAGE, ITEM [57] ABSTRACT

Line 6, "signal." should read --signal source.--.

COLUMN 3

Line 19, "Also" should read --Also,--.
    Line 64, "signals,.independently" should read --signals, independently--.

COLUMN 7

Line 43, "received" should read --receiving--.

COLUMN 8

Line 43, "beam a" should read --beam at--.

UNITED STATES PATENT AND TRADEMARK OFFICE
CERTIFICATE OF CORRECTION

PATENT NO. : 5,140,675

DATED : August 18, 1992

INVENTOR(S) : KUNIO OKADA

It is certified that error appears in the above-identified patent and that said Letters Patent is hereby corrected as shown below:

COLUMN 9

Line 7, "all" should be deleted.

Signed and Sealed this

Thirty-first Day of August, 1993

Attest:

BRUCE LEHMAN

*Attesting Officer*  *Commissioner of Patents and Trademarks*